July 6, 1926.
G. R. MIDDLETON
FISHHOOK
Filed Dec. 26, 1924
1,591,640
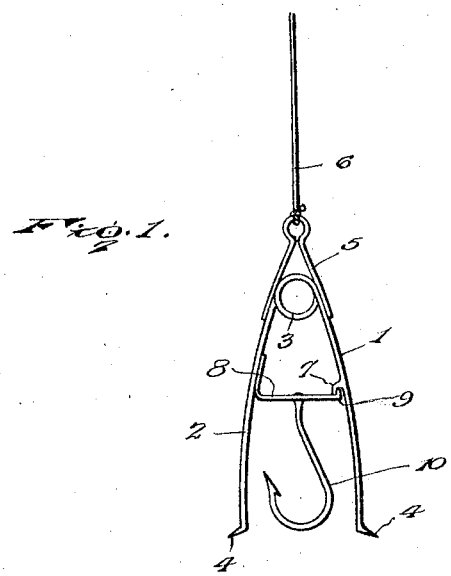
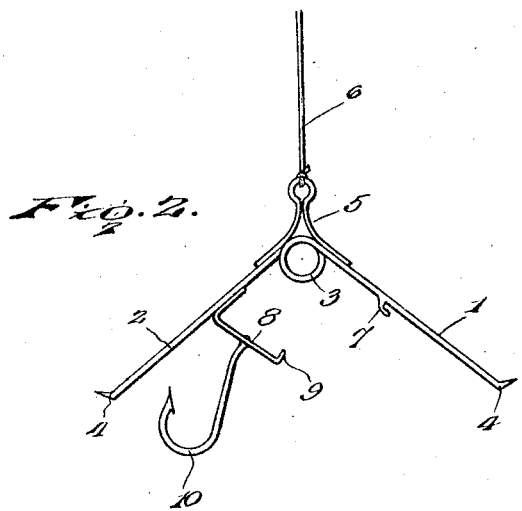
Inventor
G. R. Middleton.
By
Lacy & Lacy, Attorneys Patented July 6, 1926.

1,591,640

UNITED STATES PATENT OFFICE.

GEORGE R. MIDDLETON, OF SEAT PLEASANT, MARYLAND.

FISHHOOK.

Application filed December 26, 1924. Serial No. 758,210.

This invention relates to fish hooks and has for its object the provision of a simple construction whereby a catch will be assured without cruelty to the fish and with safety to the fisherman. The invention is illustrated in the accompanying drawing and consists in certain novel features which will be particularly pointed out in the appended claims.

In the drawing:

Figure 1 is an elevation of my improved fish hook as it appears when arranged for use, and Fig. 2 is a similar view showing the fish hook released as when making a catch.

The fish hook embodying my invention comprises two impalement jaws 1 and 2 which are constructed of resilient wire or light rods connected midway their ends by a coil 3 the ends of the impalement jaws being formed into barbs 4 which are adapted to partly penetrate the gills or the throat of the fish and secure it, when they have been released. At the coil 3, a loop 5 is secured to the jaws to facilitate the attachment of the hook to the line 6 and this loop or eye is somewhat resilient so that it will follow the movement of the jaws in the operation of the hook. The loop or eye may be secured to the jaws in any preferred manner as by soldering. Upon the inner side of the jaw 1 between the end of the jaw and the coil 3, is formed or secured a lug 7 constituting a keeper for the latch 8, the said latch consisting of a resilient wire or light rod firmly united at one end with the jaw 2 and adapted to extend across the space between the jaws, the free end of the latch being formed into an upstanding hook 9 adapted to engage behind the keeper or lug 7 as shown in Fig. 1, and thereby hold the jaws in closed position. The latch carries a bait holder 10 which may be of any preferred form and is illustrated as a barbed hook. This bait holder may be disposed in a plane common to the jaws 1 and 2 as illustrated, or may be disposed at an angle to said plane. When it is disposed at an angle to the plane, a shorter latch may be used and the jaws may be held closer together but when it is disposed as illustrated, the liability of the fisherman being injured by the barb of the hook is lessened.

The action of the hook will be readily understood. Bait is placed upon the bait holder 10 and the jaws are pressed toward each other so that the hook 9 of the latch will engage the keeper 7, as shown in Fig. 1. When a fish attracted by the bait attempts to remove the same, the pull exerted upon the bait and the bait holder will withdraw the latch from the keeper and the jaws will then at once spring apart, as shown in Fig. 2, and impale the fish.

The device is exceedingly simple, may be produced at a low cost and may be freely handled by a fisherman without liability to injure him while the fish will be securely caught and will be held until the hook is withdrawn after landing the fish.

Having thus described the invention, I claim:

1. A fish hook comprising a strand of resilient material bent to provide a spring member and arms extending therefrom and terminating in penetrating prongs, a line-engaging member formed from a strip of resilient material bent to provide an eye adapted to have the line secured therein and arms extending in diverging relation to each other and secured to the upper end portions of the first-mentioned arms in straddling relation to said spring member, and means to releasably hold the first-mentioned arms in a set position after being moved towards each other.

2. A fish hook comprising a strand of resilient material bent to provide a spring member and arms extending therefrom and terminating in penetrating prongs, a resilient latch bar extending between said arms and having one end portion bent to form a foot extending longitudinally of one of the arms and rigidly secured thereto and at its free end provided with a bill, a keeper rigid with the other arm and disposed for engagement by the bill of said latch bar to releasably retain the arms in a set position, and a bait holder carried by said latch bar and extending downwardly therefrom and disposed between the lower portions of said arms.

3. A fish hook comprising a strand of resilient material bent to form arms extending in diverging relation toward their free ends and terminating in penetrating prongs, said arms being normally spread apart and adapted to be forced towards each other to a set position, bait holding means adapted to releasably hold said arms in the set position, and line engaging means adjacent the joined ends of said arms and serving to limit spreading of the arms when released.

In testimony whereof I affix my signature.

GEORGE R. MIDDLETON. [L. S.]